United States Patent [19]

Helot et al.

[11] Patent Number: 5,781,177
[45] Date of Patent: Jul. 14, 1998

[54] COMBINED HIGH-SPEED AND LOW-SPEED INFRARED TRANSCEIVER ON COMPUTER DISPLAY PANEL HOUSING

[75] Inventors: Jacques H. Helot; Michael D. Derocher, both of Corvallis; Dennis R. Esterberg, Philomath; Peter J. Wyatt, Portland, all of Oreg.

[73] Assignee: Hewlett-Packard Company, Palo Alto, Calif.

[21] Appl. No.: 739,335

[22] Filed: Oct. 29, 1996

[51] Int. Cl.⁶ .................................................. G09G 5/00
[52] U.S. Cl. ........................ 345/156; 345/158; 359/154
[58] Field of Search ................................ 345/156, 158; 359/154

[56] References Cited

U.S. PATENT DOCUMENTS

| | | | |
|---|---|---|---|
| 4,977,619 | 12/1990 | Crimmins | 455/607 |
| 5,075,792 | 12/1991 | Brown et al. | |
| 5,323,203 | 6/1994 | Maruyama et al. | |
| 5,347,646 | 9/1994 | Hirosawa et al. | |
| 5,371,623 | 12/1994 | Eastmond et al. | 359/167 |
| 5,383,043 | 1/1995 | Su | |
| 5,414,761 | 5/1995 | Darbee | |
| 5,541,414 | 7/1996 | Hori | |
| 5,638,092 | 6/1997 | Eng et al. | 345/158 |

Primary Examiner—Richard A. Hjerpe
Assistant Examiner—Ronald Laneau
Attorney, Agent, or Firm—Curtis G. Rose

[57] ABSTRACT

A high-speed infrared ("IR") port and a low-speed IR port are co-located at a notebook computer display panel housing. Both IR ports are directional with a different sensing direction. The high-speed IR port is located along an upper side edge of the display panel housing. The low-speed IR port is located above the display panel along the viewing face of the display panel housing adjacent to the high-speed IR port. The low-speed IR port is disabled while the notebook computer display panel is in the closed position, and is enabled when out of the closed position. Conversely, the high-speed IR port is enabled while the notebook computer display panel is in the closed position and is disabled when out of the closed position. Collocating the ports allows convenient access to each port. The ports share a common electrical interface thereby reducing circuitry.

20 Claims, 4 Drawing Sheets

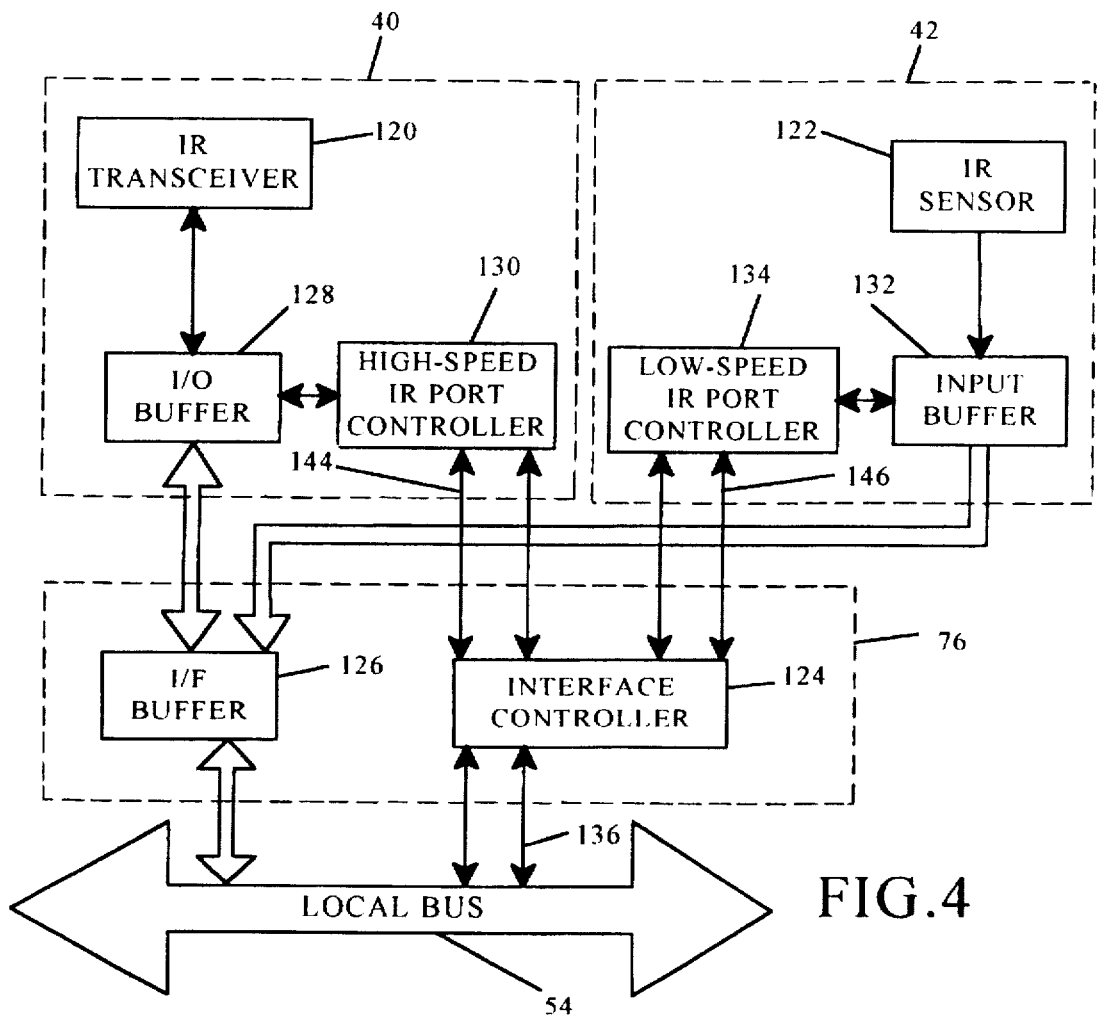
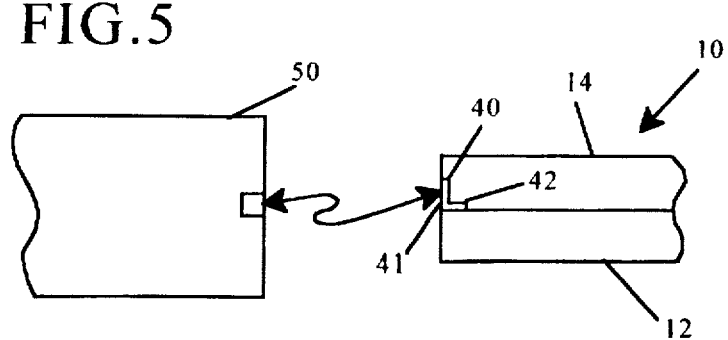

COMBINED HIGH-SPEED AND LOW-SPEED INFRARED TRANSCEIVER ON COMPUTER DISPLAY PANEL HOUSING

BACKGROUND OF THE INVENTION

This invention relates generally to digital communication interfaces using infrared ("IR") radiation signals, and more particularly, to IR-based communication interfaces for computer devices.

Infrared communication interfaces are particularly desirable for use in small and portable computing devices. For example, some notebook computers include an IR port for high speed data transmission. A high speed IR port is used for sending data from the notebook computer to a printer or for transferring data between the notebook computer and a docking station, a desktop computer, a network server computer, another notebook computer or a personal digital assistant computing device ('PDA'). A characteristic of the IR interface is the lack of a wire for carrying signals between the notebook computer and its communication target. The lack of a wire reduces the number of components a user handles and reduces the weight of devices to be transported. The lack of a wire also makes the process for connecting to another device an automated process. Conventionally, a high speed IR port is located along a rear panel of a notebook computer case with other interface ports and connectors.

Another type of IR communication interface is a low speed wireless IR interface. A low speed IR interface is implemented as a built-in or an add-on capability enabling some notebook computers to be remotely controlled. Such remote control is desirable for giving presentations. For example, according to one known add-on device an infrared receiver is coupled to a notebook computer via a cable and an interface card. The interface card plugs into the computer. The IR receiver is separately housed and rests on the desktop. A user points a remote control at the IR receiver and issues commands in a manner similar to operating a remote control for a television or other appliance. The commands are relayed from the IR receiver to the interface card via a cable.

SUMMARY OF THE INVENTION

According to the invention, a high-speed infrared ("IR") port and a low-speed IR port are co-located within a notebook computer display panel housing. Both IR ports are directional. Each IR port, however, has a different sensing direction.

According to one aspect of the invention, the high-speed IR port is located along an upper side edge of the display panel housing. It sends or receives IR radiation along a direction generally outward from the upper side edge (i.e., its sensitivity domain is a subset within the range ±45° relative to the side edge's normal vector).

According to another aspect of the invention, the low-speed IR port is located above the display panel along the viewing face of the display panel housing adjacent to the high-speed IR port. The low-speed IR port senses IR radiation along a direction generally inward toward the viewing face (i.e., its sensitivity domain is a subset within the range ±45° relative to the viewing face's normal vector).

According to another aspect of the invention, the low-speed IR port is disabled while the notebook computer display panel is in the closed position and is enabled while the notebook computer display panel is out of the closed position (e.g., open). Conversely, the high-speed IR port is enabled while the notebook computer display panel is in the closed position and is disabled while the notebook computer display panel is out of the closed position.

According to another aspect of the invention a switch detects when the notebook computer display panel is closed. The switch has a first state corresponding to a closed notebook computer and a second state corresponding to an open notebook computer. The switch state defines the state of a position signal. The position signal enables one or the other of the high-speed IR port and the low-speed IR port.

According to an alternative aspect of the invention, a notebook computer includes a connector at an upper side edge of the display panel housing. An IR port housing attaches to the connector. The connector defines an electrical and a mechanical interface between the IR port housing and the notebook computer. The IR port housing includes a high-speed IR port and a low-speed IR port. The high-speed IR port has a direction of sensitivity differing from that of the low-speed IR port. The high-speed IR port is oriented to send or receive IR radiation along a direction generally outward from the display panel housing's upper side edge. The low-speed IR port is oriented to sense IR radiation along a direction generally inward toward the display panel's viewing face. According to another aspect of the invention the IR housing is movable relative to the notebook computer to rotate and adjust the orientation of the IR ports.

One advantage of the invention is that the high-speed and low-speed ports share a common electrical interface thereby reducing the circuitry for implementing two IR ports. Another advantage is that the locations of the two ports allow convenient access to the ports. By locating the low-speed IR port above the display panel, the port is readily accessible to receive commands from a remote control device. The location provides a convenient target for aiming the remote control. While a viewer sits in front of the display panel watching a presentation, a salesperson or other presenter stands behind, to the side or away from the viewer and controls the presentation. By locating the high-speed IR port at an adjacent upper side edge, the port is accessible for downloading or uploading data while the computer is closed. These and other aspects and advantages of the invention will be better understood by reference to the following detailed description taken in conjunction with the accompanying drawings.

BRIEF DESCRIPTION OF THE DRAWINGS

FIG. 4 is a schematic diagram of the dual infrared interfaces according to an embodiment of this invention;

FIG. 5 is a diagram of a high-speed IR transfer between the computer of FIG. 1 and a target device;

DESCRIPTION OF SPECIFIC EMBODIMENTS

Overview

Figure 1:
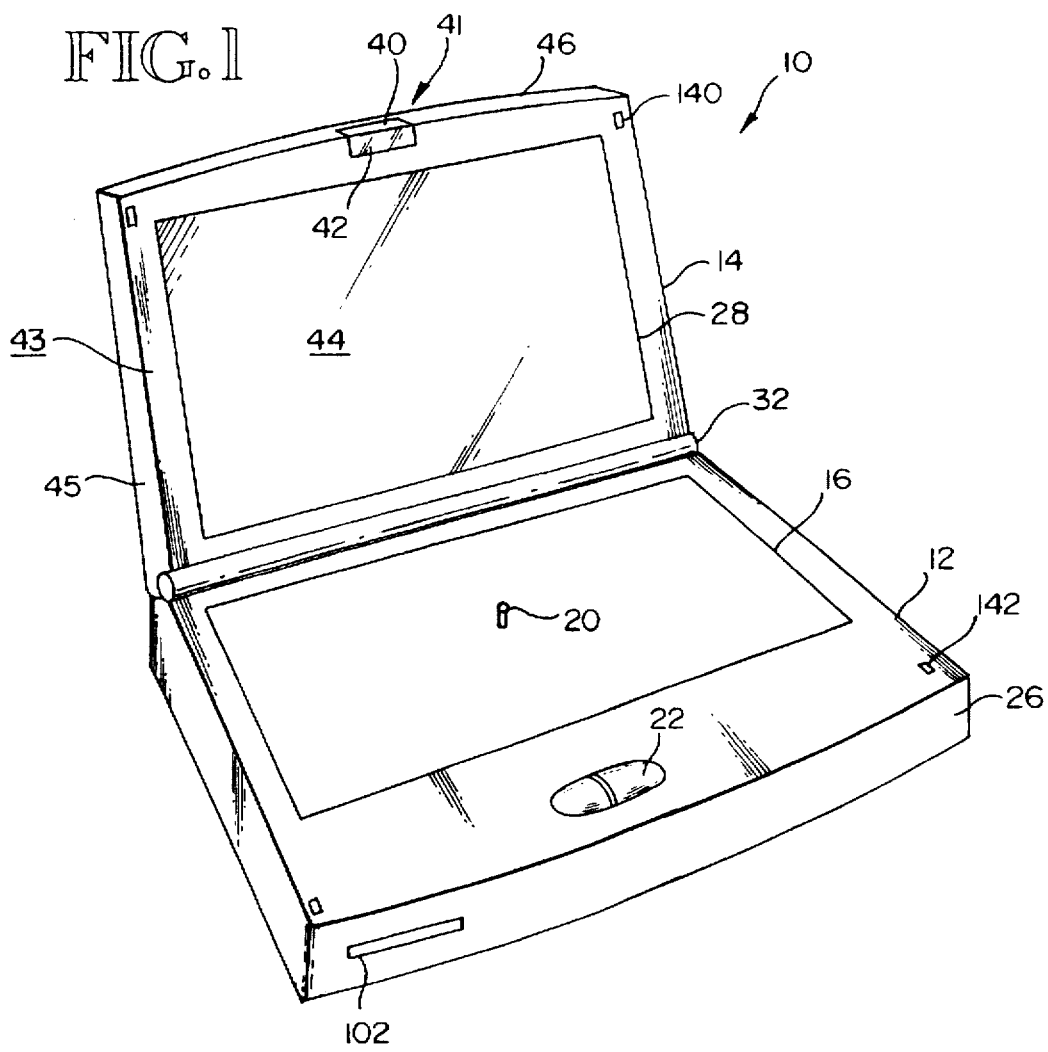
FIG. 1 is a perspective view of a notebook computer having dual infrared ports according to an embodiment of this invention.
Figure 2:
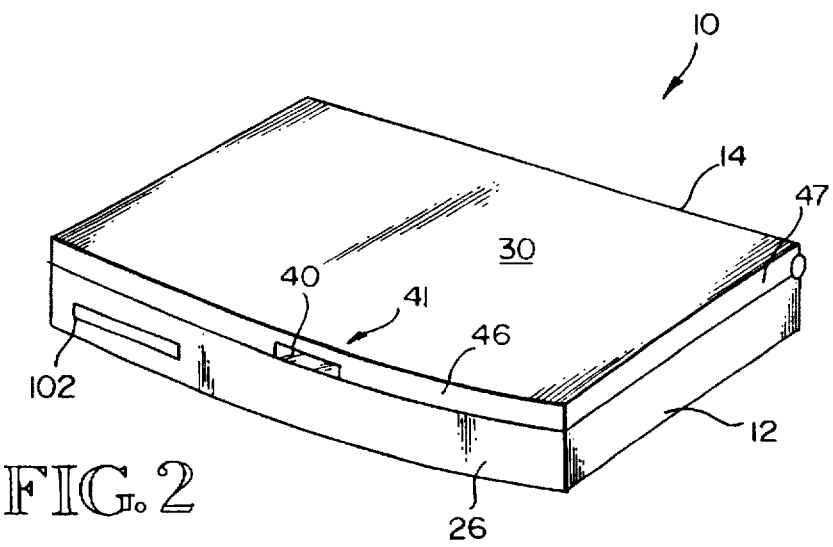
FIG. 2 is a perspective view of the notebook computer of FIG. 1, shown in the closed position.

FIGS. 1 and 2 show a general purpose notebook computer 10 useful for performing any of multiple computing, business, entertainment and communication tasks. The computer 10 includes a system unit 12 and a display unit 14. The system unit 12 includes a keyboard 16, a processor 18, a pointing device 20, a clicking device 22, memory 24 and a mass storage device 26 (see FIG. 3 for part nos. 18, 24). The display unit 14 includes a display panel 28 and a display panel housing 30. The display unit 14 is attached to the system unit 12 and rotates on hinge 32 between an open position (shown in FIG. 1) and a closed position (shown in FIG. 2).

Of significance the computer 10 includes collocated infrared ("IR") communication ports 40, 42. In one embodiment the two ports share a common IR lens 41. In an alternative embodiment two IR lenses are used. The IR ports 40, 42 move with the display unit 14 as the display unit rotates relative to the system unit 12 between the open position and the closed position. In the embodiment shown the IR ports 40, 42 are integral to the display unit 14. One IR port 40 serves as a high-speed data input/output interface. The other IR port 42 serves as a low-speed input interface. The high-speed IR port 40 is useful for transferring data between the notebook computer 10 and a target device such as a desktop computer, network server or peripheral device (e.g., a printer). The low-speed IR port 42 is useful for sensing IR transmissions from a remote control device.

Computer Architecture

Figure 3:
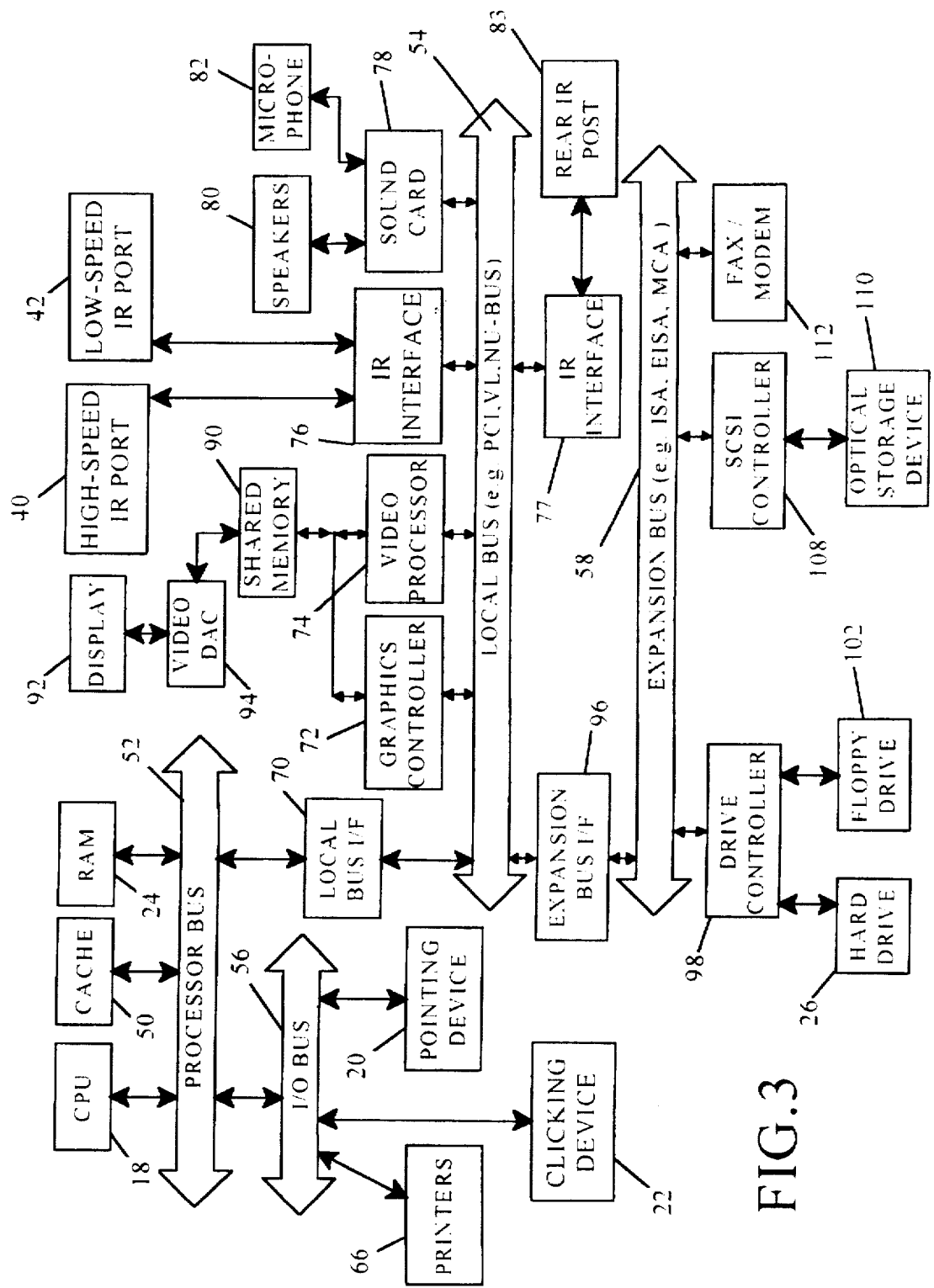
FIG. 3 is a block diagram of a notebook computer architecture.

FIG. 3 shows a system architecture for the notebook computer 10. The computer 10 includes a processor 18, system memory (e.g., 24, 50), multiple communication busses 52, 54, 56, 58 and several system components and peripherals. The number and types of communication busses, system components and peripherals varies for differing embodiments. For the computer 10 shown, there is a processor bus 52, local bus 54, I/O bus 56 and expansion bus 58. The processor 18, external cache 50 and system RAM 24 are located on the processor bus 52. The I/O bus 56 is linked to the processor bus 52 for interfacing to I/O ports. A printer 66, pointing device 20 and clicking device 22 (e.g., mouse) typically are coupled to the I/O bus 56.

The local bus 54 is linked to the processor bus 52 via a local bus interface 70. Exemplary local busses are the video local (VL) or VESA-standard bus, the peripheral component interface (PCI) bus and the NU-BUS. The PCI bus, for example, may couple up to 10 peripheral devices. Illustrated are a graphics controller 72, video processor 74, two infrared digital communication interfaces 76, 77, and a sound card 78. Speakers 80 and a microphone 82 are linked to the sound card 78. The high-speed infrared port 40 and the low-speed infrared port 42 are linked to the infrared digital communication interface 76. Another IR port 83 is located along a rear panel of the notebook computer 10 and interfaces to the IR interface 77. The video subsystems 72, 74 typically share a local memory resource (i.e., frame buffer or video RAM) 90. Information is passed to a flat panel display 92 from the video subsystems and shared memory 90 via a video DAC 94.

The expansion bus 58 is linked to the processor bus 52 via the local bus 54 and an expansion bus interface 96. Peripherals, system components and mass storage devices typically are coupled to the expansion bus 58. Shown are a drive controller 98 coupling to a hard disk drive (mass storage device) 26 and a floppy disk drive 102, a SCSI controller 108 coupling to an optical storage device 110 or other SCSI peripheral, and a fax/modem 112. As an alternative to the SCSI controller 108, any of several proprietary controllers also may couple to an optical storage device 110. According to other architectures the hard drive 100 and/or the optical storage device 110 (e.g., CD-ROM) and there respective controllers instead are coupled to the local bus 54.

The architecture shown is an exemplary architecture. The notebook computer 10 embodies a proprietary work station, personal computer, PENTIUM computer, APPLE MACINTOSH computer, or other computer currently available or to come based on the Intel 80X86 architecture, Motorola 68XXX architecture, PowerPC architecture or other CISC processor architectures, RISC processor architectures and other single or multiple multiprocessor architectures. Alternatively the computer 10 embodies simpler architectures for hand-held computing devices or is INTERNET communication devices.

IR Communication Interface

As shown in FIGS. 1 and 2, the high-speed IR port 40 and low-speed IR port 42 are located adjacent to each other on the display unit 14. The display unit housing 30 includes a viewing face 43 and multiple side edges 45, 46, 47. The display panel 28 defines a viewing plane 44. The viewing face 43 corresponds to the viewing plane 44. The high-speed IR port 40 is located along the upper side edge 46 of the display housing 30. The low-speed IR port 42 is located above the display panel 28 on the viewing face 43 at a position adjacent to the high-speed IR port 40.

The high-speed IR port 40 includes an IR transceiver 120 (see FIG. 4) which is a directional device. During a transmit operation, the IR transceiver 120 emits infrared radiation outward from the upper side edge 46 of the display unit housing 30. In one embodiment the IR radiation is spread over an angle of ±15°. During a receive operation, the IR transceiver 120 senses infrared radiation impinging on the sensor within a domain of angles spanning 30°. According to preferred embodiments such domain occurs within a range of angles between ±30° relative to a normal vector to the upper side edge 46. In a preferred embodiment the high speed IR port 40 conforms to the standards of the Infrared Data Association (IrDA) standards for IR communications. The IrDA is located at Walnut Creek, Calif.

The low-speed IR port 42 includes an IR sensor 122 (see FIG. 4) which also is a directional device. The IR sensor 122 detects infrared radiation impinging on the sensor 122 within a domain of angles spanning ±15°. According to preferred embodiments such domain occurs within a range of angles between ±30° relative to a normal vector to the viewing face 43. In a preferred embodiment the high speed IR port 42 conforms to the standards of the Infrared Data Association (IrDA) standards for IR communications. The IrDA is located at Walnut Creek, Calif. In an alternative embodiment, communication standards for television infrared remote control devices are used for low speed IR data transfers.

In one embodiment the high-speed IR port 40 and low-speed IR port 42 are independently operable. In such embodiment, the direction ranges for the two ports are set not to overlap. In preferred embodiments, only one of the high-speed IR port 40 and low-speed IR port 42 are enabled at a given time. In some of such embodiments the directional ranges of the two ports 40, 42 overlap to maximize the angular sensitivity range.

FIG. 4 shows a schematic diagram of circuitry for implementing the IR ports 40, 42. The IR ports 40, 42 are linked to the computer data paths via an IR interface 76 and the local bus 54. The IR interface 75 includes an interface controller 124 and an interface buffer 126. The high-speed IR port 40 includes the IR transceiver 120, an input/output buffer 128 and a high-speed IR port controller 130. The low-speed IR port 42 includes the IR sensor 122, an input buffer 132 and a low-speed IR port controller 134. In various embodiments the high-speed IR port transceiver inputs or outputs data at a throughput rate of 1 MB per second or 4 MB per second, although other rates are implemented in other embodiments. The low-speed IR port sensor 122 inputs data at a throughput rate between 2400 bps and 115 kbps.

During operation, the interface controller 76 receives a position signal 136 indicative of whether the notebook computer is open or closed. In one embodiment the position signal 136 has a first state while the display unit 14 is closed to the system unit 12, and has a second state when the display unit 14 is not closed to the system unit 12. The interface controller 76 activates an enable signal 144 enabling the high-speed IR port 40 when the position signal 136 is in the first state (i.e., display unit closed). The interface controller 76 activates an enable signal 146 enabling the low-speed IR port 42 while the indicating signal 136 is in the second state (i.e., display unit not closed).

When the high-speed IR port 40 is enabled, data is either one of transmitted out or received in via the IR transceiver 120. For a transmission, data is channeled through the local bus 54 into the interface buffer 126. Based upon timing and control signals exchanged between the interface controller 124 and the high-speed IR port controller 130 data is transferred to the output buffer 128. The IR transceiver is 120 then is modulated according to the data pattern stored in the output buffer 128 under timing and control determined by the high-speed IR port controller 130. The IR transceiver modulation results in modulated infrared radiation emitted outward from the upper side edge 46 (e.g., toward a target communication device). In some embodiments the high-speed IR port controller 130 is embodied in the interface controller 124.

For reception of data at the high-speed IR port 40 the high-speed IR port controller 130 periodically samples the IR transceiver 120 to read a voltage signal corresponding to sensed IR radiation. The sampled value is stored in the buffer 128. Over time, samples are compiled to forms bytes of data. The incoming data is moved from the buffer 128 into and/or through the interface buffer 126 and onto the local bus 54 for processing or storage. The high-speed IR port controller 130 and the interface controller 124 exchange timing and control information to accomplish the data transfer.

When the low-speed IR port 42 is enabled, data is received in via the IR sensor 122. The IR sensor 122 detects IR radiation and generates a voltage signal. The low-speed IR port controller 134 periodically samples the IR sensor 122 to read the voltage signal corresponding to sensed IR radiation. The sampled value is stored in the input buffer 132. Over time, samples are compiled to form bytes of data. The incoming data is moved from the buffer 132 into and/or through the interface buffer 126 and onto the local bus 54 for processing or storage. The low-speed IR port controller 134 and the interface controller 124 exchange timing and control information to accomplish the data transfer. In some embodiments the low-speed IR port controller 134 is embodied in the interface controller 124.

Referring again to FIG. 1, a switch is defined by contacts 140, 142. The switch generates the position signal 136. When the contacts 140, 142 touch, the position signal defines a first state corresponding to the display unit 14 being closed. When the contacts 140, 142 do not touch, the position signal 136 defines a second state corresponding to the display unit 14 not being closed. The contact 140 is located at the display unit 14, while the contact 142 is located at the system unit 12. In a best mode embodiment the contacts 140, 142 are sheltered away from a user's touch to prevent erroneous switch states from being generated.

In an alternative embodiment a switch is implemented at the display unit hinge 32. The switch generates the position signal 136. Specifically, when the hinge 32 moves into a first position corresponding to a closed display unit 14, the switch defines the position signal 136 to be in the first state. When the hinge 32 moves out of a first position (i.e., the display unit 14 not closed), the switch defines the position signal to be in the second state.

High-Speed Data I/O

FIG. 5 shows the computer 10 in the closed position for communicating with a target device 150. Typically, the target device 150 is a computer, network server or peripheral device. To perform a transfer from computer 10 to the target device 150, the transfer is set up for transmission at the notebook computer 10 and/or the target device with the display unit 14 in the open position. At this point the high-speed IR port 40 is disabled. Once the user selects the file or data to be transferred and selects a command to commence the transfer, the user moves the display unit 14 into the closed position. This enables the high-speed IR port 40 and triggers transmission of data out the IR transceiver 120. Similarly, for high speed data reception, the user first sets up the reception, then closes the display unit 14. The computer 10 then awaits the incoming data from the target device 150.

Low-Speed Remote Control Sensing

Figure 6:
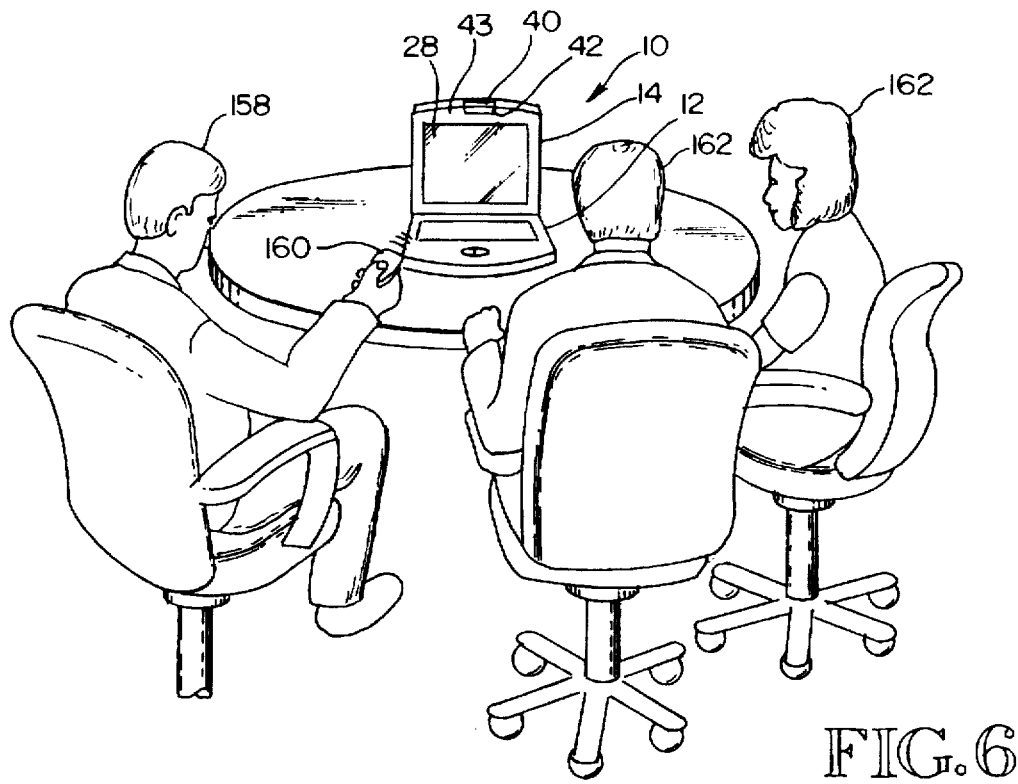
FIG. 6 is a perspective view of a remote control operation of the computer of FIG. 1.

FIG. 6 shows the computer 10 as used for giving a desktop presentation. With the computer 10 in the open position, a first user 158 holds a remote control device 160. The remote control device 160 is a conventional infrared remote control which emits encoded commands based upon a limited command button palette. One or more viewers 162 are positioned in front of the computer 10 viewing the display panel 28. The first user 158 inputs commands to the computer 10 via the low-speed IR port 42 located above the display panel 28 along the viewing face 43. The commands are routed through the low-speed IR port 42 and the IF interface 76 onto the local bus 54. Eventually, the commands are processed and result in an appropriate action at the display (e.g., change slide; alter volume).

Alternative Embodiments

Figure 7:
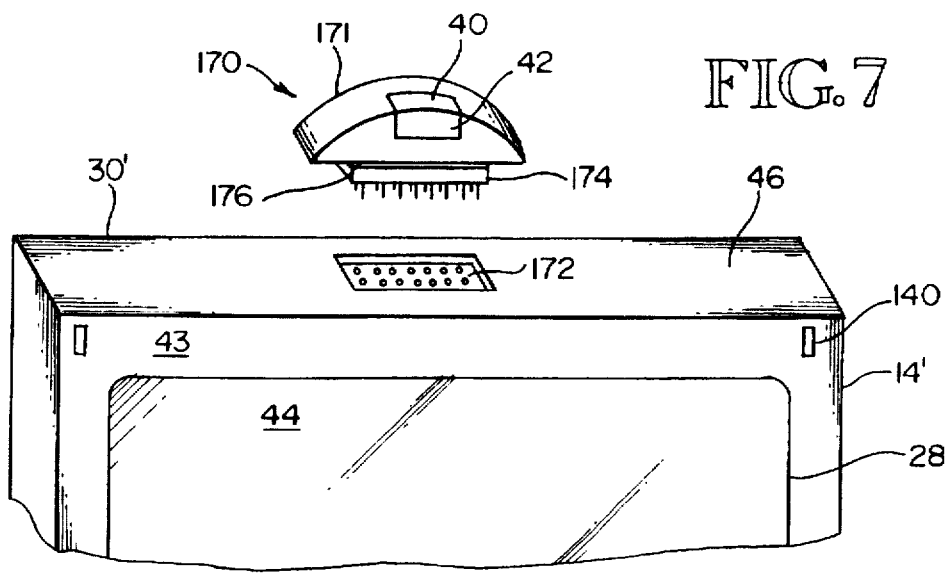
FIG. 7 is a perspective view of a notebook computer having dual infrared ports according to another embodiment of this invention.

FIG. 7 shows an alternative embodiment in which the collocated IR ports 40, 42 are implemented in an add-on device 170 which attaches to the display unit 14'. The display unit 14' includes a connector 172 above the display panel 28. In one embodiment the connector 172 is located along the upper side edge 46 of the display housing 30' The add-on device 170 includes a connector 174 mating to the display unit's connector 172. The connectors 172, 174 serve as a mechanical and electrical connection between the IR ports 40, 42 and the display unit 14'. One IR port 40 is a high-speed IR port 40 as previously described for the embodiment of FIG. 1. The other IR port 42 is a low-speed IR port 42, also, as previously described for the embodiment of FIG. 1. The IR ports 40, 42 are implemented in the manner as described with regard to FIG. 4.

The connectors 172, 174 are fixed and remain stationary while connected. In one embodiment the remaining portion 171 of the add-on device 170 rotates relative to the connector 174 to enable a user to vary the orientation of the IR ports 40, 42. The orientation of port 40 is fixed relative to port 42, but the orientation of the two can be adjusted relative to the notebook computer 10. A universal joint 176 is implemented in one embodiment to enable the device 170 to be adjusted within multiple degrees of freedom. In other embodiments motion is restricted to rotational movement parallel to the plane of the top edge 46 and/or perpendicular to the top edge 46. In other embodiments the joint for adjusting orientation of the device 170 occurs at the notebook computer 10 rather than at the device 170. In such embodiment the connectors 172, 174 move with the device 170. In specific embodiments the range of adjustment is limited to avoid excess twisting of internal wires connected to the connector 174/172.

Meritorious and Advantageous Effects

One advantage of the invention is that the high-speed and low-speed ports share a common electrical interface thereby reducing the circuitry for implementing two IR ports. Another advantage is that the locations of the two ports allows convenient access to the ports. By locating the low-speed IR port 42 above the display panel 28, the port 42 is readily accessible to receive commands from a remote control device. The location provides a convenient target for aiming the remote control. By locating the high-speed IR port 40 at an adjacent upper side edge 46, the port 42 is accessible for downloading or uploading data while the computer 10 is closed.

Although a preferred embodiment of the invention has been illustrated and described, various alternatives, modifications and equivalents may be used. For example, although the IR ports 40, 42 and IR interface 76 are shown coupled to the local bus 54, in alternative embodiments the IR ports 40, 42 and IR interface 76 are coupled to the processor bus 52, the I/O bus 56 or the expansion bus 58. Further, an additional IR port 83 is implemented in some embodiments within the system unit 12 along a rear panel to perform high speed data communication between the notebook computer 10 and another computing device or peripheral (e.g., docking station, desktop computer, another notebook computer, network server, personal digital assistant, INTERNET access device, printer). Therefore, the foregoing description should not be taken as limiting the scope of the inventions which are defined by the appended claims.

What is claimed is:

1. A portable computing apparatus, comprising:

a system unit having a processing unit;

a display unit attached to the system unit, the display unit comprising a display housing and a display panel, the display unit folding relative to the system unit between an open position for viewing the display panel and a closed position at which the display panel is blocked from viewing and covers a portion of the system unit, wherein the display panel defines a viewing plane;

a first infrared transceiving port positioned at the display unit and operable at a first throughput rate; and a second infrared sensing port positioned at the display unit and operable at a second throughput rate less than the first throughput rate.

2. The apparatus of claim 1, in which the second infrared sensing port is located adjacent to the first infrared transceiving port.

3. The apparatus of claim 2, further comprising an infrared lens in common to the first infrared transceiving port and the second infrared sensing port.

4. The apparatus of claim 1, in which the display housing defines an upper side edge and a viewing face, the viewing face corresponding to the viewing plane of the display panel; and wherein the first infrared transceiving port is located along the upper side edge and the second infrared sensing port is located above the display panel along the viewing face of the display housing.

5. The apparatus of claim 1, in which the first infrared transceiving port and the second infrared sensing port share a common electrical interface for routing electrical signals to the processing unit.

6. The apparatus of claim 1, further comprising:

a first port enable signal which when active enables operation of the first infrared transceiving port; and a second port enable signal which when active enables operation of the second infrared sensing port; and wherein at most one of the first port enable signal and second port enable signal are active at the same time.

7. The apparatus of claim 6, further comprising: a switch having a first state while the display unit is in the closed position and wherein the first port enable signal is active while the switch is in the first state.

8. The apparatus of claim 6, further comprising: a switch having a second state while the display unit is in the open position, and wherein the second port enable signal is active while the switch is in the second state.

9. The apparatus of claim 1, in which the display unit further comprises a first connector, and further comprising an IR port housing within which are located the first infrared transceiving port and the second infrared sensing port; and wherein the IR port housing defines a second connector for detachably mating to the first connector of the display unit, the first connector and second connector serving as an electrical and a mechanical interface between the display unit and the first and second IR ports, and wherein while connected the first infrared transceiving port is oriented outward from an upper side edge of the display panel housing and the second infrared sensing port is oriented outward from the display housing viewing face.

10. The apparatus of claim 9, in which at least a portion of the IR port housing is adjustable to change orientation of the first and second IR ports relative to the display housing.

11. A portable computing apparatus, comprising:

a system unit having a processing unit;

a display unit attached to the system unit, the display unit comprising a display housing and a display panel, the display unit folding relative to the system unit between an open position for viewing the display panel and a closed position at which the display panel is blocked from viewing and covers a portion of the system unit, the display panel mounted to the display housing and defining a viewing plane, the display unit housing defining an upper side edge and a viewing face, the viewing face corresponding to the viewing plane of the display panel;

a first infrared transceiving port operable at a first throughput rate;

a second infrared sensing port operable at a second throughput rate less than the first throughput rate, wherein the second infrared sensing port is located adjacent to the first infrared transceiving port;

an infrared lens in common to the first infrared transceiving port and the second infrared sensing port; and wherein the first infrared transceiving port and second infrared sensing port move with the display unit as the display unit folds between the open position and closed position.

12. The apparatus of claim 11, in which the display housing defines an upper side edge and a viewing face, the viewing face corresponding to the viewing plane of the display panel; and wherein the first infrared transceiving port is located along the upper side edge and the second infrared sensing port is located above the display panel along the viewing face of the display housing.

13. The apparatus of claim 11, further comprising:
a first port enable signal which when active enables operation of the first infrared transceiving port;
a second port enable signal which when active enables operation of the second infrared sensing port; and
wherein at most one of the first port enable signal and second port enable signal are active at the same time.

14. The apparatus of claim 11, in which the display unit further comprises a first connector, and further comprising an IR port housing within which are located the first infrared transceiving port and the second infrared sensing port; and wherein the IR port housing defines a second connector for detachably mating to the first connector of the display unit, the first connector and second connector serving as an electrical and a mechanical interface between the display unit and the first and second IR ports.

15. The apparatus of claim 14, in which at least a portion of the IR port housing is adjustable to change orientation of the first and second IR ports relative to the display housing.

16. A method for communicating with a notebook computer, the notebook computer comprising a system unit, a display unit, a first infrared transceiving port and a second infrared sensing port, the system unit having a processing unit, the display unit having a display housing and a display panel, the display unit attached to the system unit, the display unit folding relative to the system unit between an open position for viewing the display panel and a closed position at which the display panel is blocked from viewing and covers a portion of the system unit, the display panel being mounted to the display housing and defining a viewing plane, the first infrared transceiving port and second infrared sensing port moving with the display unit as the display unit folds between the open position and closed position, the first infrared transceiving port operable at a first throughput rate, and the second infrared sensing port operable at a second throughput rate less than the first throughput rate, the method comprising the steps of:
remotely controlling an operation of the notebook computer via a command sensed at the second infrared sensing port while the display unit is in the open position; and
moving data either one of into or out of the notebook computer via the first infrared transceiving port while the display unit is in the closed position.

17. The method of claim 16, in which the first infrared transceiving port is disabled during the controlling step.

18. The method of claim 16, in which the second infrared transceiving port is disabled during the moving step.

19. The method of claim 16, in which the second infrared sensing port is located adjacent to the first infrared transceiving port;
wherein the display unit housing defines an upper side edge and a viewing face, the viewing face corresponding to the viewing plane of the display panel; and
wherein the first infrared transceiving port is located along the upper side edge and the second infrared sensing port is located above the display panel along the viewing face of the display panel housing.

20. The method of claim 16, wherein at most one of the first infrared transceiving port and second infrared sensing port are active at the same time, and further comprising the step of enabling the second infrared sensing port prior to the step of controlling and the step of enabling the first infrared transceiving port prior to the step of moving data.

* * * * *